United States Patent [19]

Gidick

[11] Patent Number: 4,510,959
[45] Date of Patent: Apr. 16, 1985

[54] METHOD FOR INSTALLATION OF AN EXTENDED HEADER

[75] Inventor: Ward F. Gidick, West Newton, Pa.

[73] Assignee: Raymond Kaiser Engineers Inc., Oakland, Calif.

[21] Appl. No.: 582,098

[22] Filed: Feb. 21, 1984

Related U.S. Application Data

[62] Division of Ser. No. 375,392, May 6, 1982.

[51] Int. Cl.³ .............................................. F16L 23/00
[52] U.S. Cl. .................................. 137/15; 29/157 R; 138/94.3
[58] Field of Search .................... 137/15, 315; 138/94, 138/94.3; 29/157 R, 157.1 R, 722; 285/325, 329; 405/136, 169, 170, 171

[56] References Cited

U.S. PATENT DOCUMENTS 2,349,889  5/1944  Steudel ............................. 29/157 R
3,731,361  5/1973  Tatterson et al. .................... 29/722

Primary Examiner—Martin P. Schwadron
Assistant Examiner—Stephen M. Hepperle
Attorney, Agent, or Firm—Flehr, Hohbach, Test, Albritton & Herbert

[57] ABSTRACT

A header or other pipe under pressure which is blanked at its terminal end by a closure plate is extended without the need of a shutdown or the construction of bypass piping. In a series of steps in the method disclosed, alternate bolts in the ring of bolts holding the closure plate to the annular flange of the existing pipe are variously repositioned or replaced to accommodate the construction of the extension while maintaining an adequate seal to prevent the escape of the pressurized fluid in the pipe. A structure which is installed as a product of this method and an apparatus used in this installation are also disclosed.

9 Claims, 12 Drawing Figures

METHOD FOR INSTALLATION OF AN EXTENDED HEADER

This is a division of application Ser. No. 375,392, filed May 6, 1982.

BACKGROUND OF THE INVENTION

1. Field of the Invention

The present invention relates to pipelines and, in particular, to methods and apparatus used in longitudinally extending pressurized headers or other pipelines.

2. Description of the Prior Art

In the course of plant expansion programs, it is often necessary to extend pressurized headers or other pipes from points where they are terminally sealed with a closure plate. Heretofore, two principal methods of effecting such an extension operation were known. The first of these methods involved shutting down the line and bleeding gaseous contents into the atmosphere. For many applications, however, such a procedure may be unsuitable because it may involve the release of an undue amount of pollutants in the area surrounding the pipeline. Furthermore, a shutdown of a header, even for a relatively short period of time, may involve the interruption of service to critical processes so as to be economically detrimental. An alternate method of extending a header is to pressure tap the line and convey its contained fluid in a specially constructed bypass line. While allowing the pressured header to be extended without the necessity of a shutdown, the construction of a bypass can be expensive and time consuming. It is, therefore, the object of the present invention to provide a means for extending a header which avoids the above described difficulties.

SUMMARY OF THE INVENTION

The present invention consists of an extended header or other existing pipe in which a terminal closure plate is or had been attached to an annular flange on the pipe. Part of the extension structure is an extension pipe member which is axially aligned with but spaced from the existing pipe. Between the existing pipe and the extension pipe, there is an intermediate annular pipe connecting apparatus from which a closure plate receiving chamber depends. A rod or like displacement means is also provided to remove the closure plate to this receiving chamber. The present invention also encompasses the annular pipe connecting apparatus and the method by which it is installed on the existing pipe to construct the above described extension. Briefly, this method involves first reversing the direction of the even positioned bolts holding the closure plate to the annular flange. The nuts engaging the odd positioned bolts are welded to the closure plate and these odd positioned bolts are then removed. The annular connecting apparatus is then connected to the apparatus by bolts which engage these fixed nuts. Thereafter, the direction of the bolts in the even positions are again reversed and the extension header is attached to the annular connecting apparatus. The bolts engaging the fixed nut are then replaced with shorter bolts that do not engage these nuts. Since these shorter bolts do not retain the closure plate in its position at the terminal end of the existing pipe, the closure plate may be displaced to the closure plate receiving chamber so that fluid communication may be established between the existing and extension pipes.

BRIEF DESCRIPTION OF THE DRAWINGS

The present invention is further described in the accompanying drawings in which.

DETAILED DESCRIPTION

Figure 1:
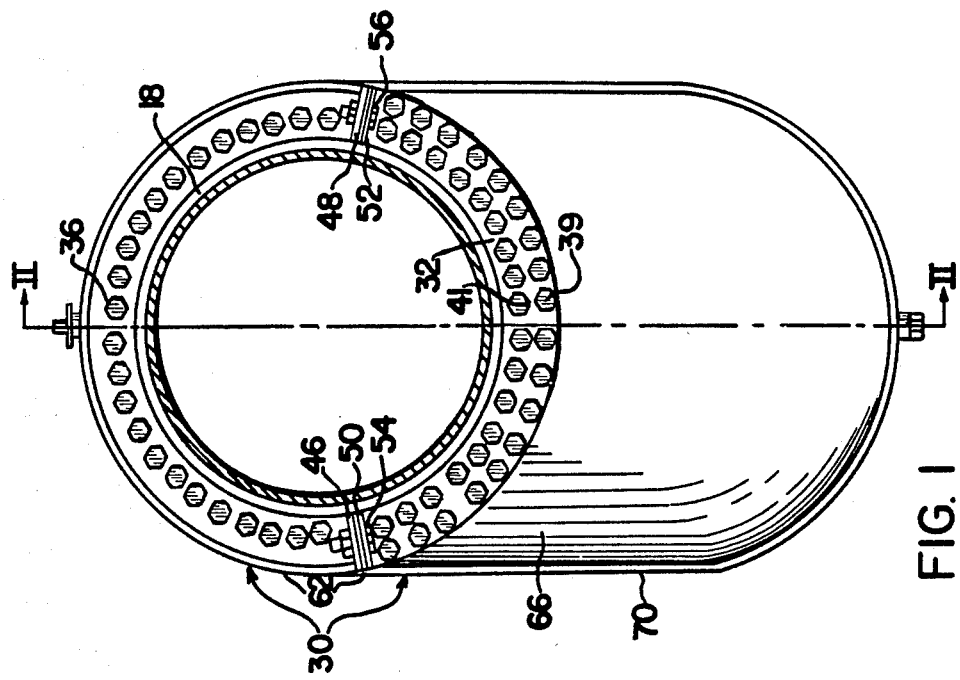
FIG. 1 is a downstream front elevational view in fragment of a preferred embodiment of the extended header structure of the present invention.
Figure 2:
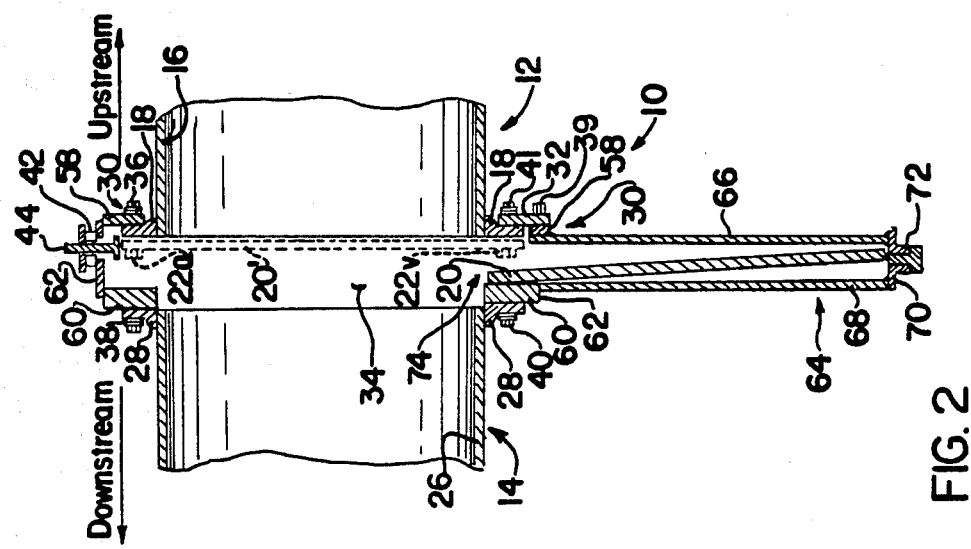
FIG. 2 is a vertical cross sectional view of the extended header structure of the present invention taken through line II—II in FIG. 1.

The extended header structure shown in FIGS. 1 and 2 includes a header connecting apparatus which is shown generally at numeral 10. This connecting apparatus joins an existing header, shown generally at numeral 12 and an extension header, shown generally at numeral 14. The present invention is considered to encompass the connecting apparatus, as well as the extended header apparatus and the method described below for constructing the same.

For the purposes of orientation, the term "upstream" will, hereafter, be used to describe the direction at or toward the source of fluid pressure in the existing header 12, or to the right on FIG. 2. Similarly, the term "downstream" will be used to describe the direction away from the source of fluid pressure in the existing header 12 or in other words, the direction in which the header is being extended. in FIG. 2 the "downstream" direction is toward the left of the drawing. Further, by way of definition, the term "upstream oriented" as applied to a bolt will be understood to mean a bolt which is installed so that its head abuts a downstream facing surface on the completed or partially completed extended structure so that its body section extends upstream therefrom. A "downstream oriented" bolt will be understood to mean a bolt which is installed so that its head abuts an upstream facing surface and its body extends in a downstream direction.

The existing header consists of a longitudinal tubular section shown in fragment at numeral 16. At its terminal end, an annular slip flange 18 is attached to the longitudinal tubular section. Before the existing header 12 is extended, a disc-shaped closure plate is attached to its terminal end to retain pressurized fluid therein. When the header connecting apparatus 10 and extension header 14 are emplaced to extend existing header 12, as shown in FIGS. 1 and 2, the closure plate is located in a position as shown in solid lines at numeral 20. Before the header connecting apparatus and extension header are so connected, the closure plate covers the terminal end of the longitudinal tubular section 16 of existing header in a manner as is shown in broken lines at numeral 20'. When the closure plate is so positioned at the terminal end of the longitudinal tubular section 16, it will be attached to slip flange 18 by means of a plurality of bolts oriented in an downstream direction and arranged circumferentially adjacent the edge of the terminal closure plate. These bolts engage nuts at their terminal ends such as those shown in broken lines at positions 22a and 22v although it will be understood that these bolts will be removed from these positions when the header connecting apparatus 10 and the extension header 14 are positioned as shown in solid lines in FIG. 2.

The extension header 14 is axially aligned with and spaced downstream from the existing header 12. It is dimensionally similar to the existing header, and has a longitudinal tubular section, shown in fragment at numeral 26, and an annular slip flange 28 on its upstream terminal end.

The header connecting apparatus consists of two integral sections. The sections are a main enclosing section shown generally at numeral 30 and a locking plate section 32. The main enclosing section substantially encloses a fluid conveying chamber 34 between existing header 12 and the extension header 14, and, as is explained in detail below, the locking plate section 32 attaches to the main enclosure section to fix the header connecting apparatus 10 in place. When the header connecting apparatus 10 and the extension header 14 are installed, the main enclosing section 30 is fixed to the slip flange 18 by an arcuate row of downstream oriented bolts as at 36. It will also be observed that the main enclosing section is fixed to the slip flange 28 by a circular arrangement of upstream oriented bolts as at 38 and 40 and that it is fixed to the locking plate section 32 by an arcuate row of downstream oriented bolts as at 39. Gaskets (not shown) will also be preferably emplaced between the main enclosing section and the slip flanges 18 and 28. Finally, the locking plate section 32 of the header connecting apparatus is fixed to the slip flange 18 by another arcuate row of downstream oriented bolts as at 41. On the top of the header connecting apparatus, there is a packing gland 42 through which a rod 44 extends into the fluid conveying chamber. As is explained in greater detail bleow, this rod is used to displace the closure plate from its position at 20' on the existing header. It will also be observed that the main enclosing section 30 has a pair of flanges 46 and 48 which abut, respectively, flanges 50 and 52 on the locking plate section 32 and are connected thereto, respectively, by bolts 54 and 56.

It will be noted that when the integral main enclosing and locking plate sections of the header connecting apparatus are assembled and as shown in FIGS. 1 and 2, an upstream annular radial wall 58, a downstream annular radial wall 60 and a tube-like longitudinal connecting wall 62 may be defined thereon. The upstream radial wall abuts the upstream side of the flange 18 in juxaposed fashion and extends outwardly therefrom. The downstream radial wall abuts the upstream side of the flange 28 and also extends outwardly therefrom. The longitudinal wall member 62 connects the upstream and downstream radial wall members. Extending from below the longitudinal wall member 62, there is a closure plate receiving chamber, generally at 64, which includes an upstream panel 66, a downstream panel 68, an arcuate connecting wall 70 and a drain 72. A lower transverse closure plate withdrawal aperature 74 in the longitudinal wall 62 is also defined to allow communication between the closure plate receiving chamber 64 and the fluid conveying chamber 34.

Figure 3:
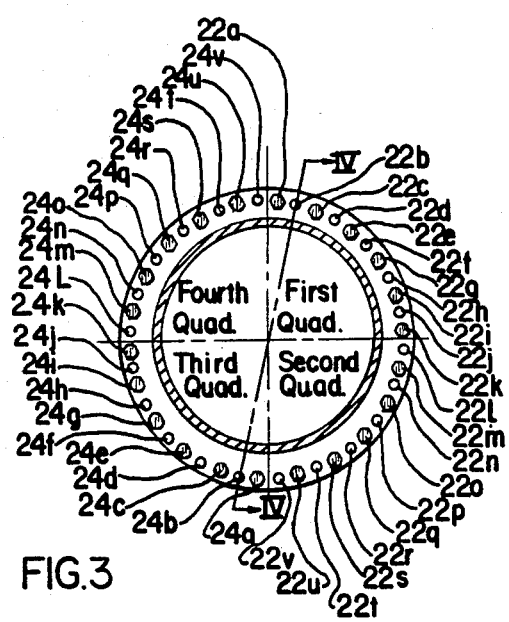
FIG. 3 is a schematic downstream front elevational view of a partially completed extended header structure at the completion of Step a in the method defined hereafter for assembling the same.
Figure 4:
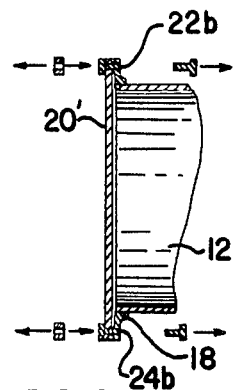
FIG. 4 is a schematic cross sectional view of a partially completed extended header structure taken through line IV—IV in FIG. 3.

The method by which the structure illustrated in FIGS. 1 and 2 is assembled is shown in FIGS. 3–12. From FIGS. 3 and 4, it will be observed that the closure plate 20' is initially retained on the slip flange 18 of the existing header by means of a plurality of bolt and nut combinations. Each of these bolts are downstream oriented having their heads bearing against the upstream side of the slip flange 18 and extending in an downstream direction through aligned aperatures in the slip flange 18 and closure plate 20' and engaging a nut on the downstream side of the closure plate. Referring, in particular, to FIG. 3, the positions of these bolts and nut connecting combinations in the first and second quadrant of their circular arrangement will be referred to by the numeral 22 with an alphabetical subscrip from a through v assigned sequentially to designage individual positions according to the relative clockwise angular displacement of the positions from the vertical centerline with the upper position being 22a, the second position being 22b, and so on through 22v for the last position in the second quadrant. Positions in the third and fourth quadrants will be similarly designated by the numberal 24 with alphabetical subscripts assigned sequentially from 24a at the lower position in the third quadrant to 24v at the upper position in the fourth quadrant. It will be observed that 24a is disposed at a position 180° from 22a as is 24b from 22b, 24c from 22c and so on. Also for purposes of definition in this preferred embodiment of the present invention, the following positions will be designated as "even retaining positions": 22b, 22d, 22f, 33h, 22j, 22l, 22n, 22p, 22v, 22t, 22v, 24b, 24d, 24f, 24h, 24j, 24l, 24n, 24n, 24p, 24r, 24t, and 24v. The remaining retaining positions will be referred to as "odd retaining positions". With reference to the above definitions, the existing header with the terminal closure plate 20' affixed to its slip ring 18 may be extended by a method comprising the following sequential steps:

Step a: Referring to FIGS. 3 and 4, nuts and downstream oriented bolts originally installed in even retaining positions as at 22b and 24b are removed. The originally installed nuts and downstream oriented bolts on odd retaining positions are left in place to prevent the escape of pressurized fluid from the existing header. After a particular bolt has been removed, the vacated aperatures through the closure plate 20' and flange 18 are enlarged and tapped where necessary, and new upstream oriented bolts are installed in the aperatures at the even retaining positions as at 22b and 24b. In effecting the above described replacement of downstream with upstream oriented bolts at the even retaining positions, it is preferable that an upstream oriented bolt be inserted in each of the even retaining positions as soon as the downstream oriented bolt originally in that position has been removed and before any other bolts are removed. This procedure which results in only one retaining position being vacated at any time is also preferred for carrying out other replacements of bolts disclosed in the method of this invention.

Figure 6:
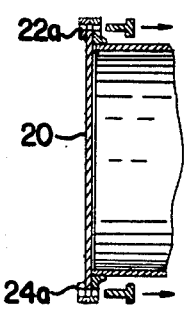
FIG. 6 is a schematic cross sectional view of a partially completed extended header structure taken through line VI—VI of FIG. 5.
Figure 5:
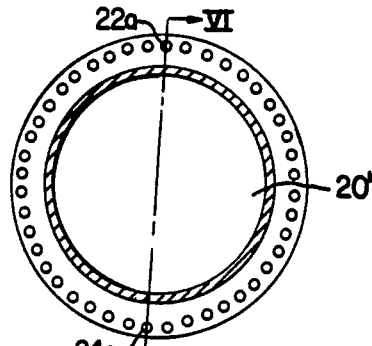
FIG. 5 is a schematic downstream front elevational view of a partially completed extended header structure at the completion of Steb b in the method defined hereafter for assembling the same.

Step b: Referring to FIGS. 5 and 6, the original nuts at odd retaining positions as at 22a and 24a are welded to the downstream facing surface of the closure plate 20'. The original downstream oriented bolts originally engaging these nuts are then removed and, if necessary, the upstream surface of the slip flange 18 is dressed. The upstream oriented bolts intalled in even retaining positions in Step a are left in place to maintain fluid pressure inside the existing header.

Figure 8:
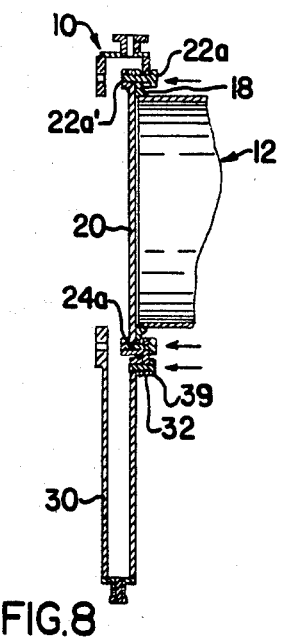
FIG. 8 is a schematic cross sectional view of a partially completed extended header structure taken through line VIII—VIII in FIG. 7.
Figure 7:
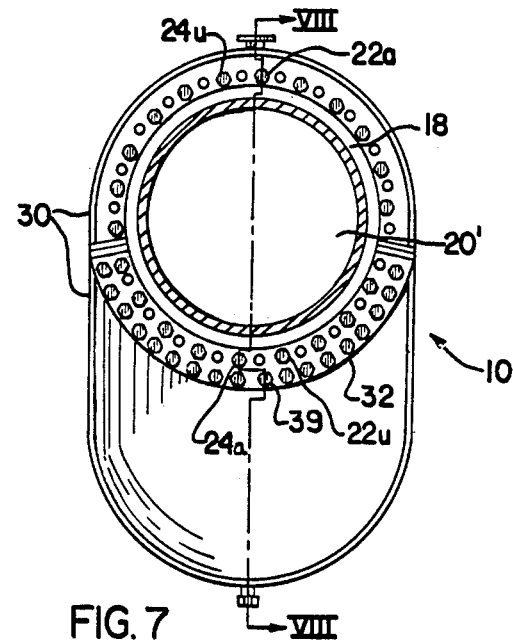
FIG. 7 is a schematic downstream front elevational view of a partially completed extended header structure at the completion of Step c in the method defined hereafter for assembling the same.

Step c: Referring to FIGS. 7 and 8, the header connecting apparatus 10 is attached to the existing header 12. The main enclosing section 30 is first positioned in the manner illustrated and attached to the slip flange 18 by means of new downstream oriented bolts installed in those aperatures at the odd retaining positions as at 22a and 24a overlapped by the main enclosing section. The locking plate 32 is also attached to the slip flange 18 by new downstream oriented bolts installed at odd retaining positions as at 24a and 22a overlapped by the locking plate. These new bolts are threaded into the original nuts which were welded to the closure plate 20' at the odd retaining positions in Step b above. The locking plate is then fixed to the main enclosing section by downstream oriented bolts as at 39.

Figure 10:
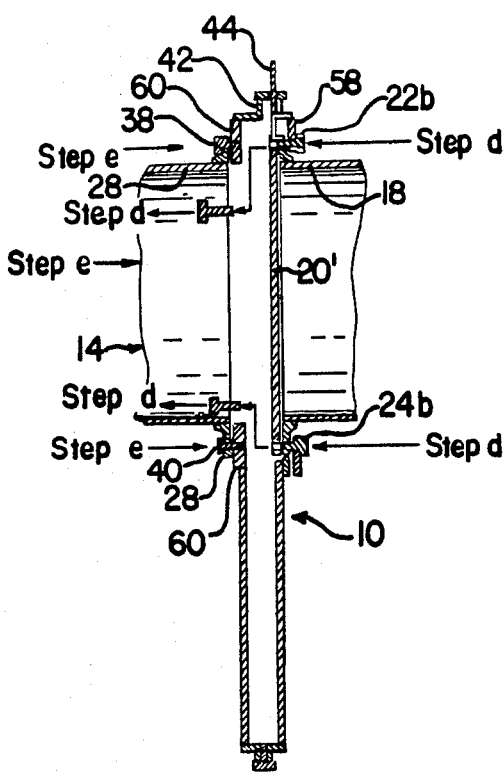
FIG. 10 is a schematic cross section view of a partially completed extended header structure taken through line X—X in FIG. 9.
Figure 9:
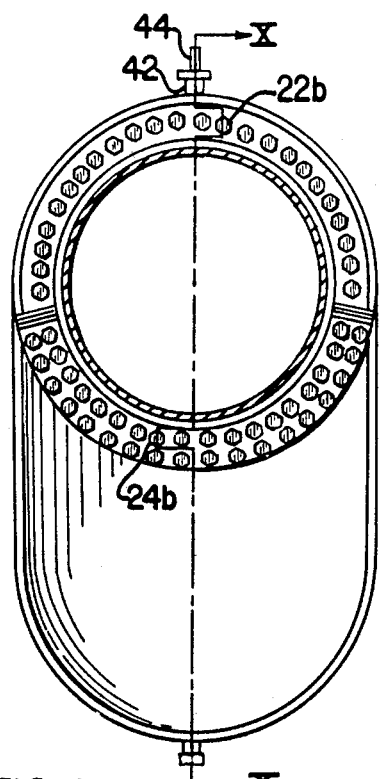
FIG. 9 is a schematic downstream front elevational view of a partially completed extended header structure at the completion of Steps d and e in the method defined hereafter for assembly of the same.

Step d: Referring to FIGS. 9 and 10, the upstream oriented bolts installed in even retaining positions as at 22b an 24b in Step a are removed and replaced in the even retaining positions as at 22b and 24b with new downstream oriented bolts which extend through the upstream radial wall 58 on the main enclosing section of the header connecting apparatus. These new downstream oriented bolts engage the flange at the previously threaded aperatures at even retaining positions but they are somewhat shorter than the bolts which they replaced so that they do not extend into the aligned aperatures in the closure plate 20' so as to engage the closure plate. At this point, it may be convenient to insert the rod 44 through the packing gland 42 on the header connecting apparatus 10 and to weld or otherwise attach the rod to the closure plate 20'.

Step e: Still referring to FIGS. 9 and 10, the extension header 14 is axially aligned with the existing header and is then attached to the downstream radial wall 60 of the header connecting apparatus by means of a plurality of upstream oriented bolts as at 38 and 40 which pass through threaded aperatures in the slip flange 28 of the extension header 14 and the header connecting apparatus. The extension header is then purged.

Figure 12:
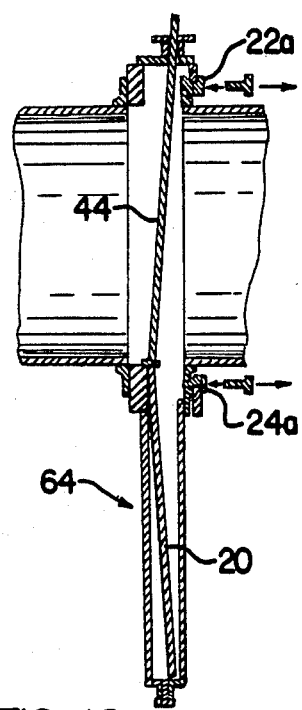
FIG. 12 is a schematic cross sectional view of a partially completed extended header structure taken through line XII—XII in FIG. 11.
Figure 11:
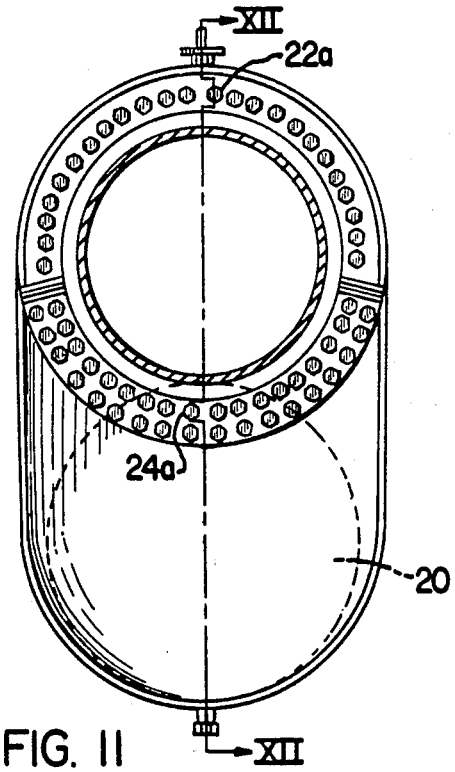
FIG. 11 is a schematic downstream front elevational view of a partially completed extended header structure at the completion of Step f in the method defined hereafter for assembly of the same.

Step f: Referring to FIGS. 11 and 12, the downstream oriented bolts which were installed at odd connecting positions as at 22a and 24a in Step c and which engage both the slip flange 18 and the closure plate 20' are removed and replaced with shorter downstream oriented bolts which engage the slip flange 18 but do not extend into the aperatures in the closure plate 20' so as to engage the closure plate. After this substitution has been accomplished, the closure plate may then be displaced from its position shown at 20' to its position shown at 20 in the closure plate receiving chamber 64 by action of the rod 44. In order to break the closure plate 20' loose from the slip flange, it may be necessary to enlarge and tap one aperature on the flange 18 in each quadrant and to install in each such aperature a long, downstream oriented bolt which bears endwise against the closure plate as it is advanced and thereby exerts pressure on the closure plate in downstream direction. When the closure plate is so displaced, fluid communication is established between the existing and the extension header.

It will be observed that in the above described embodiment of the method of the present invention that the even retaining positions are positioned adjacent to odd retaining positions such that these positions are alternated along the periphery of the annular flange 18. For this reason, when the bolts in either the even or odd retaining positions are removed to accomplish any of the steps of this method, retaining means will still be emplaced in the adjoining retaining positions so as to maintain the tightest possible seal between the flange and the closure plate. While the designation of alternate positions on the flange periphery as "even retaining positions" and the designation of the remaining positions are as "odd retaining positions" is, therefore, preferred, it is not considered to be essential. Referring, for example, to FIG. 3, it will be possible to designate the first six retaining positions in every quadrant as "even retaining positions" while designating the remaining positions as "odd retaining positions" as long as the use of retaining means only on either of said groups of positions would be sufficient to maintain the seal between the closure plate 20' and the flange 18. Accordingly, it will be understood that the use hereinafter of the terms "even retaining positions" and "odd retaining positions" is limiting only to the extent that these terms refer to mutually exclusive groups of positions wherein the use of a retaining means on either group will have the effect of establishing an adequate seal between the closure plate and the annular flange of the existing header. It will also be understood that the use of the term "bolt" herein will refer to any cylindrical or nearly cylindrical fastener with a helical groove cut into its lateral surface. While it is considered preferable that such fasteners have conventional hexagonal heads, the use of headless fasteners or fasteners having heads of other shapes to carry out one of more of the steps of the method described above will be considered within the scope of this invention.

It will thus be appreciated that there has been described a method, an apparatus and a product of this method for extending a blanked existing header under pressure. This method not only avoids shutdown and the risk of polluting the area around the header but it will also generally be less expensive and time consuming than other methods heretofore known.

Although the invention has been described herein with a certain degree of particularity, it is to be understood that the present disclosure has been made only as an example and that the scope of the invention is defined by what is hereinafter claimed.

What is claimed is:

1. A method for extending in a downstream direction an existing fluid containing pipe having an annular flange on which a terminal closure plate is retained in juxtaposed relation by a plurality of peripherally arranged, downstream oriented bolts, each of which bolts passes through a pair of aligned longitudinal aperatures in the flange and closure plate to engage a retaining nut on its downstream end and wherein a portion of said pairs of aligned longitudinal aperatures are designated as even retaining positions and the remainder of said pairs of aligned aperatures are designated as odd retaining positioning, said method comprising the steps of:

(a) replacing the downstream oriented bolts and nuts engaged therewith at the even retaining positions with upstream oriented bolts;

(b) independently fixing to the closure plate the nuts engaged with the downstream oriented bolts at the odd retaining positions and then removing said bolts from the odd retaining positions;

(c) fixing an annular pipe connecting apparatus at its upstream end to the annular flange of the existing pipe by first engaging said apparatus with downstream oriented bolts emplaced at the odd retaining positions and then engaging said bolts with the nuts independently fixed to the closure plate in step (b);

(d) replacing the upstream oriented bolts emplaced at the even retaining positions in step (a) with downstream oriented bolts engaging the annular pipe connecting apparatus but not engaging the closure plate;

(e) fixing, at its downstream end, the annular pipe connecting apparatus to an extension pipe; and (f) replacing the downstream oriented bolts installed at the odd retaining positions in step (c) with shorter downstream oriented bolts not engaging the closure plate or the nuts independently fixed thereto in step (c), such that the closure plate may be disengaged and displaced from the existing pipe.

2. The method defined in claim 1 wherein the aperatures in the closure plate at the even connecting positions are tapped before the downstream oriented bolts installed in step (a) are emplaced.

3. The method defined in claim 1 wherein the nuts engaged with the upstream oriented bolts at the odd retaining positions are welded to the closure plate in step (b).

4. The method defined in claim 1 wherein the annular pipe connecting apparatus has upstream and downstream radial annular wall members connected by a longitudinal annular wall member and in step (c) the upstream annular wall member is fixed to the annular flange by positioning said upstream annular wall member in upstream juxtaposed abutting relation with said flange and emplacing downstream oriented bolts at the odd connecting positions to engage the nuts independently fixed to the closure plate in step (b).

5. The method defined in claim 4 wherein the extension pipe has a terminal annular flange which is attached to the downstream radial annular wall by means of a plurality of upstream oriented bolts.

6. The method defined in claim 1 wherein after step (d) is completed, a closure plate displacement means is fixed to the closure plate.

7. The method defined in claim 6 wherein the closure plate displacement means is a rod which extends through the annular pipe connecting apparatus.

8. The method defined in claim 7 wherein the annular pipe connecting apparatus has a depending closure plate receiving chamber to which the closure plate is displaced after its disengagement from the existing pipe.

9. The method defined in claim 7 wherein the annular pipe connecting apparatus has a closure plate receiving chamber depending downwardly therefrom, and the rod extends downwardly through the pipe connecting apparatus and bears against the closure plate so as to displace said closure plate downwardly into said receiving chamber after its disengagement from the existing pipe.

* * * * *